(12) United States Patent
Trunz et al.

(10) Patent No.: US 6,369,959 B1
(45) Date of Patent: Apr. 9, 2002

(54) ASSEMBLY COMPRISING AN OPTICAL ELEMENT AND A MOUNT

(75) Inventors: Michael Trunz, Pfahlheim; Bernhard Dipl.-Ing Gellrich, Aalen; Roland Dipl.-Ing Gischa, Ulm; Hubert Holderer, Königsbronn; Cornelia Rösch, Aalen, all of (DE)

(73) Assignee: Carl-Zeiss-Stiftung (DE)

( * ) Notice: Subject to any disclaimer, the term of this patent is extended or adjusted under 35 U.S.C. 154(b) by 0 days.

(21) Appl. No.: 09/587,858

(22) Filed: Jun. 6, 2000

(30) Foreign Application Priority Data

Jul. 2, 1999 (DE) .......................................... 199 30 643

(51) Int. Cl.⁷ .................................................. G02B 7/02

(52) U.S. Cl. ...................................... 359/819; 359/830

(58) Field of Search ................................ 359/811, 819, 359/820, 822, 830

(56) References Cited

U.S. PATENT DOCUMENTS

| | | | | | |
|---|---|---|---|---|---|
| 5,299,066 | A | * | 3/1994 | Rombult | 359/819 |
| 5,570,238 | A | * | 10/1996 | Leary | 359/820 |
| 6,166,868 | A | * | 12/2000 | Holderer et al. | 359/819 |
| 6,188,841 | B1 | * | 2/2001 | Kamata | 396/6 |
| 6,198,579 | B1 | * | 3/2001 | Rupp | 359/820 |
| 6,229,657 | B1 | * | 5/2001 | Holderer et al. | 359/822 |

FOREIGN PATENT DOCUMENTS

DE 197 35 831 A1 2/1999

* cited by examiner

Primary Examiner—Georgia Epps
Assistant Examiner—Saeed Seyrafi
(74) Attorney, Agent, or Firm—Welsh & Katz

(57) ABSTRACT

An assembly comprising an optical element and a mount has a fastening flange 2, an intermediate element 3 in at least approximately the form of a funnel and an inner ring 4. The optical element 1 is mounted in the inner ring 4, which is connected to the fastening flange 2 via the intermediate element 3. The intermediate element 3 is connected on the side with the smaller diameter to the inner ring 4 and on the side with the greater diameter to the fastening flange 2.

18 Claims, 3 Drawing Sheets

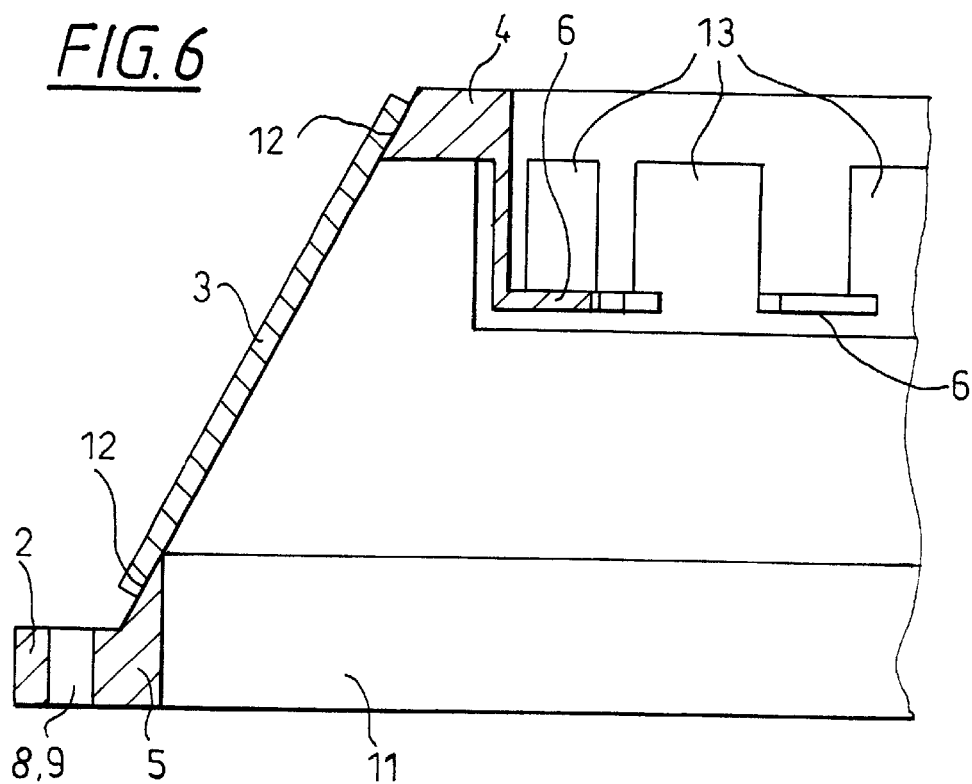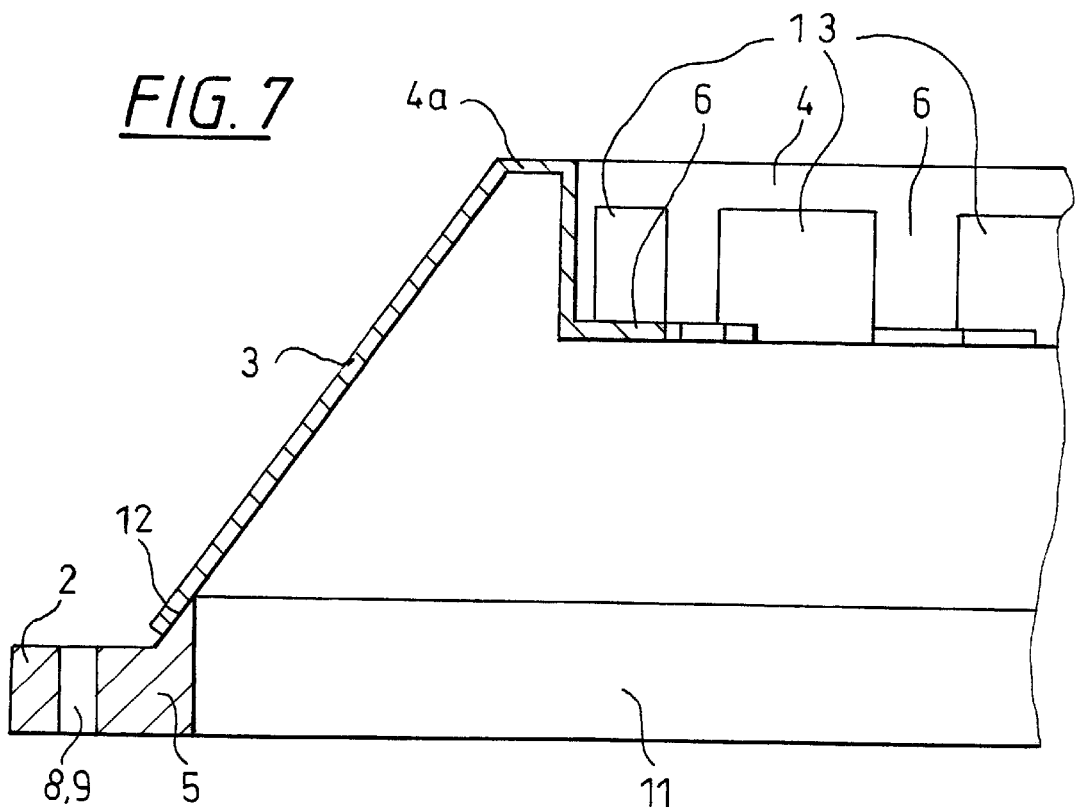

ASSEMBLY COMPRISING AN OPTICAL ELEMENT AND A MOUNT

FIELD OF THE INVENTION

The invention concerns an assembly comprising an optical element and a mount.

Assemblies with lenses as optical elements, which are connected to a fastening flange via inner rings, are already known from practice. Although the inner ring allows isolation in terms of deformation, it is disadvantageous in this case that rigidity is not adequate and some known designs also have problems in terms of structural space.

DE 197 35 831 A1 discloses a galvanoplastic optical mount in which small supporting feet are produced in a galvanoplastic way as supporting surfaces for an optical element. In this case, after being detached from a mold core, an inner ring produced in this way is severed between webs, so that the small supporting feet project freely from an outer ring without being connected to one another. In practice, the inner ring is separated in this way into a multiplicity of individual segments or small supporting feet.

SUMMARY OF THE INVENTION

The present invention is based on the object of providing an assembly of the type mentioned at the beginning which, with a relatively small radial structural space and a specifically selected design of the mount, makes it possible for the optical element to be isolated in terms of deformation, it being intended at the same time to obtain good rigidity.

This object is achieved according to the invention by an assembly corresponding to the features stated in claim 1.

According to the invention, a three-part mount, which has a fastening flange, an intermediate element in the form of a funnel and an inner ring, is used for the optical element, for example a lens. Each of the three parts of the mount in this case assumes a specific task and can, accordingly, be respectively adapted optimally to this task. The fastening flange is used for connecting the respective optical element to the assembly or to an assembly. The intermediate element in the form of a funnel is relatively rigid on account of its geometry and is therefore not readily deformed, while the fastening flange, which is generally designed as a flanged ring, can adapt to the deformations introduced. Production tolerances in the flange region can be isolated by a correspondingly designed connection between the intermediate element and the fastening flange. This can be assisted by cut-free, elastic elements on the fastening flange. Furthermore, weakenings of the cross section are possible in the region of the flange ring, the intermediate element and/or the connecting point between the two.

The intermediate element will generally be produced from a thin-walled metal sheet by a forming technique, giving it a rigid structure both in the axial direction and in the radial direction, which ensures that the optical elements are mounted under the required natural frequency. Any passing on of deformations to the optical element is additionally prevented by the inner ring, which serves for receiving the optical element and for isolating deformations.

Other configurations are, for example, monolithic production (the entire mount made from one piece) or electrodeposition (Ni) of the thin-walled intermediate element on a core with simultaneous growth at the fastening flange and at the inner ring. Depending on the shaping of the mold core, the galvanoplastically deposited intermediate element may likewise also comprise the inner ring and, if appropriate, also the supporting surfaces in the form of small supporting feet, in that it or they are integrated into the intermediate element.

In an advantageous embodiment of the invention, for this purpose the inner ring is provided with at least three elastic supporting surfaces, for example small supporting feet, which are arranged such that they are distributed over the circumference and on which the optical element is mounted.

By introducing into the region of the intermediate element elastic elements which can deform themselves when a deformation is introduced, the passing on of deformations to the inner ring is prevented to an even greater extent. A possible solution for this is to provide the intermediate element with incisions. The incisions may in this case run both in a radial direction and in an axial direction.

In a very advantageous development of the invention, a space-saving connection with adjacent mounts can be created by means of the fastening flange for the forming of a lens system. For this purpose, a plurality of mounts comprising a fastening flange, an intermediate element and an inner ring are connected to one another in one screwing-on plane of the fastening flanges.

In the case of known configurations of mounts, relatively considerable structural space is required on account of the connecting method with screws. The type of connection according to the invention in only one screwing-on plane allows not only low deformation but also at the same time a structural-space-saving connection to be established.

According to the invention, a type of connection by which each individual mount is readjustable is to be provided here. This means that all the screws for the corresponding mounts should be accessible from outside independently of one another.

In a very advantageous refinement of the invention, this is achieved by the mount (or mounts) following a mount with screwed-in screws being provided with through-bores in the fastening flange, which are in line with the screwed-in screws and have diameters which correspond at least to the greatest diameters of the screws.

BRIEF DESCRIPTION OF THE DRAWING

Further advantageous refinements and developments emerge from the remaining subclaims and from the exemplary embodiment described in principle below with reference to the drawing, in which:

FIG. 6 shows a fastening flange and an inner ring with an electrodeposited intermediate element on a mold core; and FIG. 7 shows a fastening flange with an electrodeposited intermediate element and an inner ring integrated into the intermediate element, or monolithic with it, on a mold core with coverings (during production) for separating the supporting surfaces, likewise monolithic with it, in the form of small supporting feet.

DETAILED DESCRIPTION OF THE DRAWING

Figure 1:
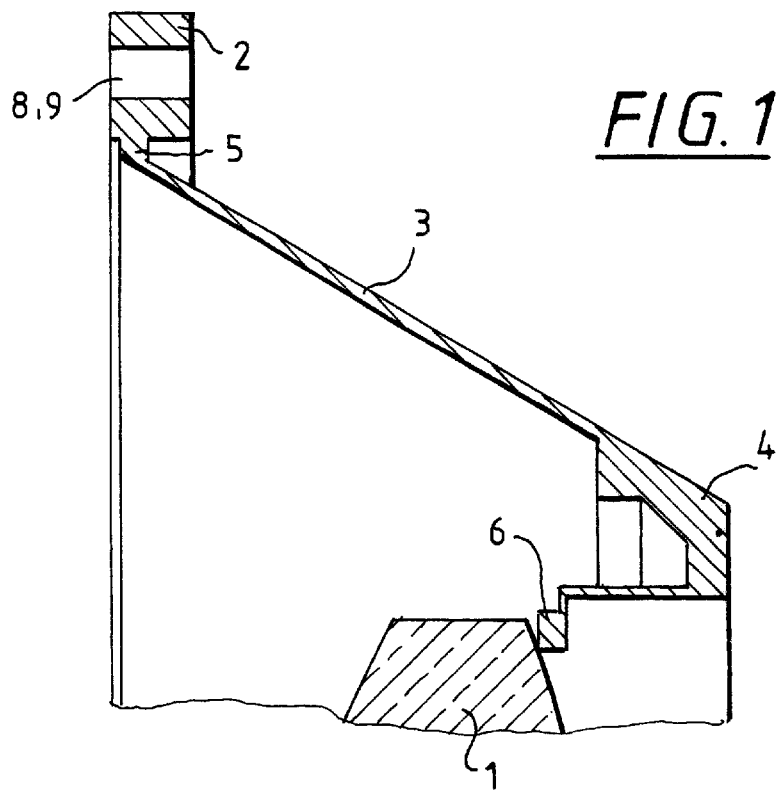
FIG. 1 shows a partial section through the assembly according to the invention with a mount, which has a fastening flange, an intermediate element in the form of a funnel and an inner ring with an optical element.

According to FIG. 1, a mount for an optical element 1 has a fastening flange 2 in the form of a flanged ring, an intermediate element 3 in the form of a funnel and an inner ring 4.

The intermediate element 3, which is referred to hereafter as a cone or funnel, is connected on the side with the greater diameter to the fastening flange 2 via a shoulder ring 5. On the side with the smaller diameter, the funnel 3 is connected to the inner ring 4. The individual elements of the mount may be joined by high-temperature soldering, laser or microplasma welding. The shoulder ring 5, to which the funnel 3 is fastened, is distinctly smaller in its thickness than the thickness of the fastening flange 2. The shape of the shoulder ring is a result of the method used for joining it to the funnel 3, so that a smaller or even a larger cross section can also be used, as specifically selected.

As can be seen from FIG. 1, the funnel 3 is of a significantly thinner-walled form in comparison with the fastening flange 2 and the inner ring 4. In general, the funnel 3 will be produced from a metal sheet, produced by a forming technique, for example a drawn, pressed or rolled sheet-metal part.

The inner circumferential wall of the inner ring 4 is provided with a plurality of small supporting feet 6 which are distributed over the circumference and on which the optical element 1 rests. In general, three small supporting feet 6, arranged such that they are evenly distributed over the circumference, will be sufficient for an exact and deformation-free mounting of the optical element 1.

The funnel angle with respect to the optical axis may be between 30° and 40°. Preferably, an angle of 30° will be provided, since in this way an isosceles character with correspondingly high strength is obtained. It goes without saying that other angle values are also possible, if appropriate.

Figure 2:
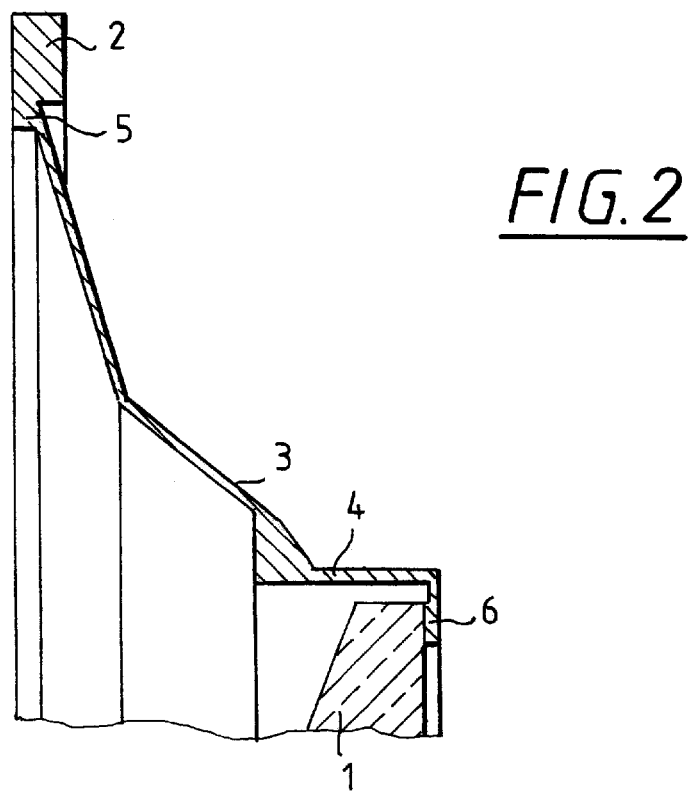
FIG. 2 shows an assembly corresponding to the exemplary embodiment according to FIG. 1, the intermediate element in the form of a funnel being provided with a stepped formation.

It can be seen from FIG. 2, which in principle shows the same structure as the exemplary embodiment according to FIG. 1, that the funnel 3 has a bend or an angled step. The shallower angle is located on the side facing the inner ring 4, while the steeper angle with respect to the optical axis is arranged on the side assigned to the fastening flange 2. In this way, a corresponding isolation in terms of deformation can likewise be achieved with high rigidity and a shorter structural length.

For further increasing the isolation in terms of deformation, it may be provided that the funnel 3 is provided with suitable incisions in a radial direction, axial direction or with combinations of these (also obliquely) (not represented).

Figure 3:
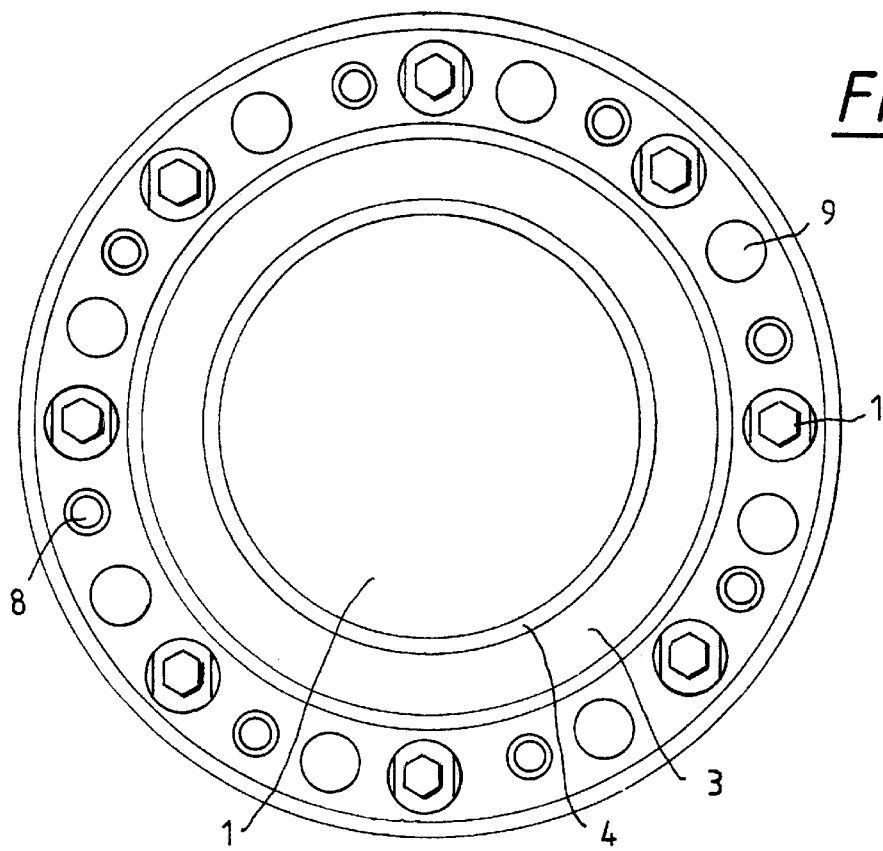
FIG. 3 shows a plan view of the assembly according to FIG. 1.
Figure 4:
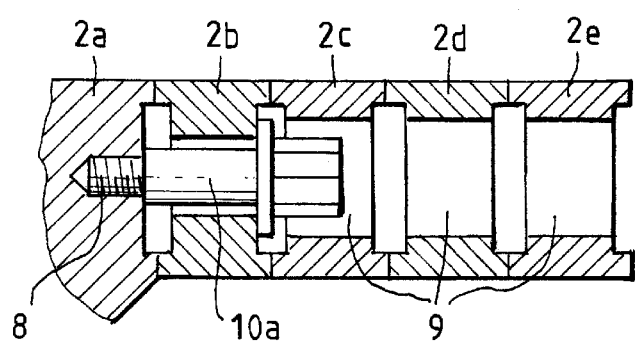
FIG. 4 shows a partial section in the region of a screw connection between a first fastening flange and a second fastening flange.
Figure 5:
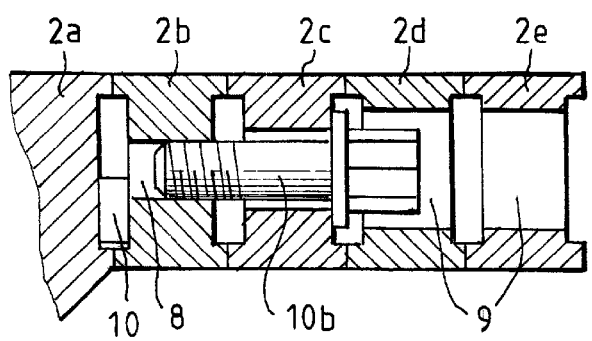
FIG. 5 shows a partial section in the region of a screw connection between a second fastening flange and a third fastening flange.

It can be seen from FIGS. 3 to 5 how, with a distinct reduction in structural space, a plurality of mounts are connected to one another in one screwing-on plane. For this purpose, each fastening flange 2 is provided with a multiplicity of bores, namely threaded bores 8 and through-bores 9. Fastening flanges 2 lying respectively adjacent to one another are connected to one another via the threaded bores 8.

FIG. 4 reveals a connection between a first fastening flange 2a and a second fastening flange 2b, a screw 10a being inserted through a screw hole into the fastening flange 2b and screwed into the threaded bore 8 of the fastening flange 2a. The third fastening flange 2c, and likewise fastening flanges 2d and 2e following it, are provided with through-bores 9, which are in line with the threaded bore 8 of the first flange 2a and consequently also with the screw 10a. As can be further seen from FIG. 4, the diameters of the through-bores 9 are chosen to be of such a size that the head of the screw 10a, or if appropriate of a shim, which has the greatest diameter can be pushed through the through-bores 9. Depending on the size of an assembly, between four and sixteen screws 10 will be respectively provided for assembly, with associated screw holes and bores 8 or 9.

FIG. 5 shows the fastening of the third fastening flange 2c to the second fastening flange 2b by a screw 10b. This figure also reveals the shank of the screw 10a, which is on the same diameter as all the bores 8 and 9 and screws 10, but is circumferentially offset. It can also be seen from this figure that the following fastening flanges 2 (for example flange 2e) have through-bores 9, via which the screws 10 can in each case be pushed through for the respective fastening of mounts lying adjacent to one another.

This refinement not only achieves the effect of reducing the structural space but at the same time also allows the mounts to be readjusted individually, since all the screws of the mounts are accessible from outside via the through-bores 9. At the same time, in this way the mounts can be nested one behind the other in such a way that there is only a minimal spacing, in particular from funnel to funnel. This ensures in particular that only a relatively small structural space is required between the optical elements and the outer contour of the system.

FIG. 6 shows the same structure in principle as FIG. 1, but here a core 11 can be seen, on which a galvanoplastically applied layer, preferably of Ni, represents the funnel 3 as the intermediate element. This funnel 3 is galvanoplastically applied to the core 11, the fastening flange 2 and the inner ring 4, as represented. Consequently, the three parts are connected by the funnel 3 during the production of the latter at the same time at joining surfaces 12. Ni with a layer thickness of 0.2 to 1.0 mm is preferably used as the material for the funnel 3. Depending on the configuration, the core 11 may be detached after the galvanoplastic process and reused or it must be dissolved or melted out. If the core 11 has to be dissolved, it is favorable to make it as thin as possible, in order that the time for dissolving is as short as possible. The core 11 may consist of conductive material, but similarly also of non-conductive material. In the latter case, the core 11 will be covered with a conductive layer.

FIG. 7 shows a similar structure to FIG. 6, but here only one fastening flange 2 is used in the production process as a prefabricated component with a—cross-sectionally—wedge-shaped shoulder ring 5 (in the same way as in FIG. 6) for better connection between the fastening flange 2 and the funnel 3. Instead of a separately prefabricated inner ring 4 with small supporting feet 6, here a thin inner ring 4 with the small supporting feet 6 is molded galvanoplastically directly on the core 11. By covering intermediate spaces 13 between the individual supporting feet 6, material can be built up only where a supporting foot 6 is to be produced. Here, too, the connection of the fastening flange 2 and funnel 3 is established at the same time during the galvanoplastic production of the funnel 3 with the inner ring 4 and the supporting feet 6.

As can be further seen from FIG. 7, the inner ring 4 is in this case of the same thickness as the funnel 3 produced monolithically with it in comparison with the inner ring according to FIG. 4. In spite of the relatively thin wall thickness, adequate stability is achieved by the flat ring region 4a.

Instead of the small supporting feet 6 extending with the longitudinal axes inward and parallel to the optical axis and the adjoining supporting surfaces directed at right angles to the optical axis, the longitudinal axes of the supporting feet 6 may also extend outward and parallel to the optical axis, although then a greater structural space is required in the axial direction or in the z direction.

What is claimed is:

1. An assembly comprising an optical element and a mount, which has a fastening flange, an intermediate element in at least approximately the form of a funnel and an inner ring, the optical element being mounted in the inner ring, which is connected to the fastening flange via the intermediate element being connected on a side with a smaller diameter to the inner ring and on a side with a greater diameter to the fastening flange, said intermediate element being a thin-walled form in comparison with the fastening flange and the inner ring.

2. The assembly as claimed in claim 1, wherein the funnel angle of the intermediate element (3) is about 30 to 40° with respect to the optical axis.

3. The assembly as claimed in claim 1, wherein the intermediate element (3) has the form of a funnel with different angles of slope.

4. The assembly as claimed in claim 3, wherein the funnel angle on the side facing the fastening flange (2) is steeper with respect to the optical axis than on the side facing the inner ring (4).

5. The assembly as claimed in claim 1, wherein the intermediate element (3) is provided with incisions.

6. The assembly as claimed in claim 1, wherein the intermediate element (3) is connected to the fastening flange (2) via a shoulder ring (5).

7. The assembly as claimed in claim 1, wherein supporting surfaces in the form of small supporting feet (6), on which the optical element (1) is mounted, are integrated into the intermediate element (3).

8. The assembly as claimed in claim 1, wherein the intermediate element (3) is produced galvanoplastically by molding on a core (11).

9. The assembly as claimed in claim 8, wherein the intermediate element (3) can be connected during the galvanoplastic production to the fastening flange (2) and/or to the inner ring (4).

10. The assembly as claimed in claim 6, wherein the shoulder ring (5) is of a wedge-shaped form.

11. The assembly as claimed in claim 1, wherein the intermediate element (3) is produced by a forming technique.

12. The assembly as claimed in claim 1, wherein the intermediate element (3) is produced by machining and is connected monolithically to the fastening flange (2) and/or the inner ring (4).

13. The assembly as claimed in claim 1, wherein a plurality of mounts, comprising a fastening flange (2), an intermediate element (3) and an inner ring (4), are connected to one another in one screwing-on plane of the fastening flanges.

14. The assembly as claimed in claim 13, wherein each individual mount is readjustable.

15. The assembly as claimed in claim 13, wherein, for the connection of the individual mounts, in each fastening flange (2) there are respectively provided a plurality of screws (10), which are arranged such that they are distributed over the circumference, lie on the same diameter and are respectively screwed into threaded bores (8) of the adjacent fastening flanges (2).

16. The assembly as claimed in claim 15, wherein the mount or mounts following a mount with screwed-in screws (10) is or are provided with through-bores (9) in the fastening flange (2), which are in line with the screwed-in screws (10) and have diameters which correspond at least to the greatest diameters of the screws (10) or of shims.

17. An assembly comprising an optical element and a mount, which has a fastening flange, an intermediate element in at least approximately the form of a funnel and an inner ring, the optical element being mounted in the inner ring, which is connected to the fastening flange via the intermediate element being connected on a side with a smaller diameter to the inner ring and on a side with a greater diameter to the fastening flange, said inner ring having at least three supporting surfaces arranged such that they are distributed over the circumference.

18. An assembly comprising an optical element and a mount, which has a fastening flange, an intermediate element in at least approximately the form of a funnel and an inner ring, said inner ring having at least three supporting surfaces arranged such that they are distributed over the circumference, the optical element being mounted in the inner ring, which is connected to the fastening flange via the intermediate element being connected on a side with a smaller diameter to the inner ring and on a side with a greater diameter to the fastening flange, said intermediate element being of a thin-walled form in comparison with the fastening flange and the inner ring.

* * * * *